United States Patent [19]

Sikula, Jr.

[11] Patent Number: 4,917,573
[45] Date of Patent: Apr. 17, 1990

[54] COOLING FAN ISOLATION MOUNT

[75] Inventor: William J. Sikula, Jr., Waterloo, Iowa

[73] Assignee: Deere & Company, Moline, Ill.

[21] Appl. No.: 359,256

[22] Filed: May 31, 1989

[51] Int. Cl.$^4$ ............................................. F04D 29/34
[52] U.S. Cl. ................................. 416/134 R; 416/500
[58] Field of Search ................. 416/134 R, 5.0, 247 R

[56] References Cited

U.S. PATENT DOCUMENTS

| | | | |
|---|---|---|---|
| 1,584,955 | 5/1926 | Leinweber | 416/134 R |
| 2,041,507 | 5/1936 | Zeder | 416/134 R X |
| 2,041,555 | 5/1936 | Lee | 416/134 R |
| 2,270,583 | 1/1942 | Forton | 416/134 R X |
| 2,299,010 | 10/1942 | Doman | 416/134 R X |
| 2,475,541 | 7/1949 | Booth | 416/134 R X |
| 2,557,201 | 6/1951 | Punt | 416/134 R X |
| 2,680,559 | 6/1954 | Morrill | 416/134 R X |
| 2,773,365 | 12/1956 | Delf et al. | 416/134 R X |
| 2,987,242 | 6/1961 | Mazzacane | 416/247 |
| 3,757,914 | 9/1973 | Elmer | 192/48.3 |
| 3,893,555 | 7/1985 | Elmer | 192/58 B |
| 4,682,679 | 7/1987 | Elmer | 192/58 C |

FOREIGN PATENT DOCUMENTS

| | | | |
|---|---|---|---|
| 1082766 | 6/1960 | Fed. Rep. of Germany | 416/134 R |
| 2425541 | 1/1980 | France | 416/134 R |
| 854690 | 11/1960 | United Kingdom | 416/134 R |

OTHER PUBLICATIONS

Truflo Brochure.

*Primary Examiner*—Everette A. Powell, Jr.

[57] ABSTRACT

An engine fan mount is provided which isolates the fan from vibrations causing pitch and yaw of the fan drive shaft. Each fan bolt is provided with a spacer extending through the fan, which metal washers at each end of the spacer on either side of the fan. Elastomeric washer are positioned about the spacer on either side of the fan between the fan and the metal washers. A slight clearance, e.g., 1 mm, is provided between the fan through bore and the spacer. When the bolt is tightened, the elastomeric washers are only slightly compressed, with the metal washers and spacers preventing further compression. The fan is free to float axially along the spacers, and to vary in angle (within the limits of the clearance) relative to the bolts and drive shaft.

6 Claims, 1 Drawing Sheet

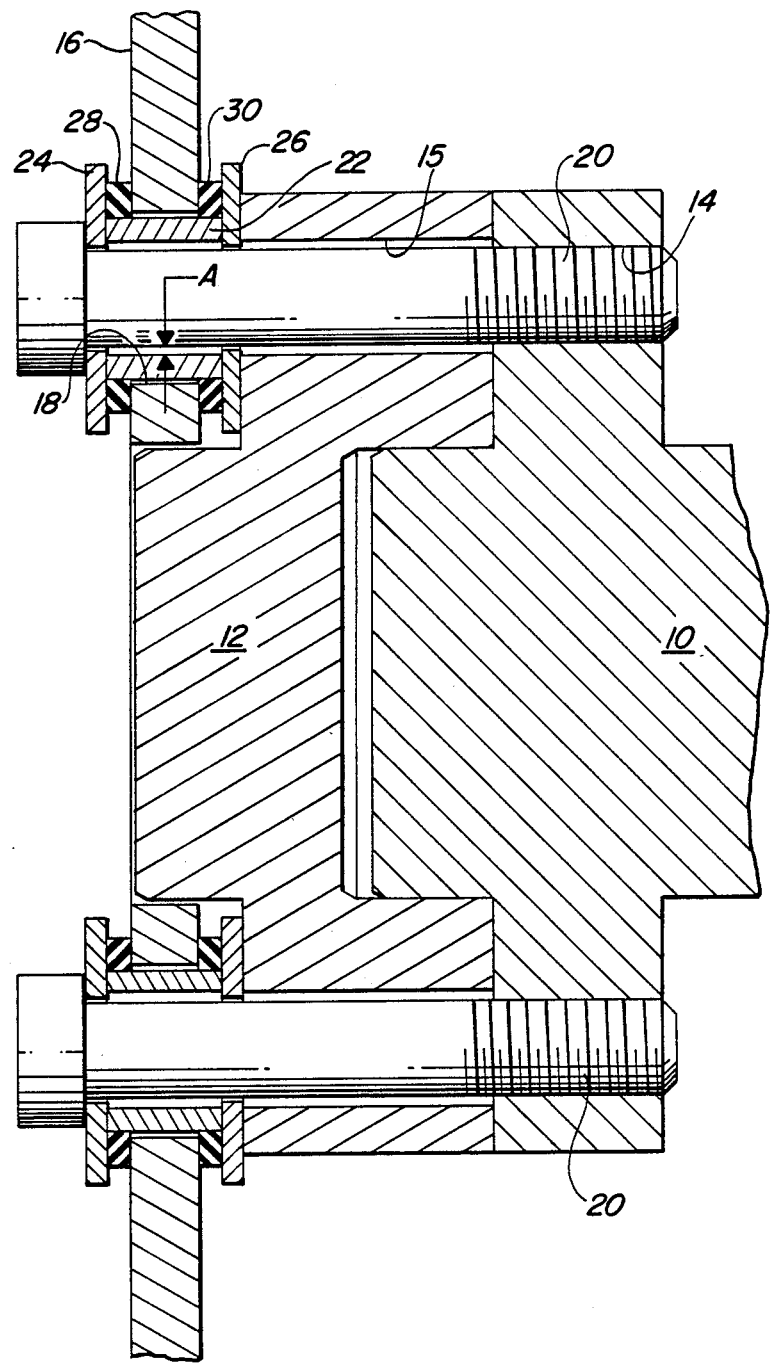

COOLING FAN ISOLATION MOUNT

BACKGROUND OF THE INVENTION

1. Field of the Invention

The present invention relates to mounting structures for fans, and particularly to mounting structures for isolating engine fans from engine vibration.

2. Description of the Related Art

Engines with an odd number of cylinders, and particularly 3-cylinder engines, are prone to vibrate in a manner which causes the axis of their drive shaft to pitch and yaw. This can pose problems for the cooling fan for the engine, since the angular momentum of the rotating fan tends to resist changes to the direction of the fan axis. In extreme cases, the fan blades may even break off from metal fatigue.

The center of a typical engine fan is co-axial with a drive shaft, e.g., for the engine water pump, mounted to the engine. A pulley or fan spacer typically is mounted to the end of the drive shaft, and the fan is piloted on the shaft or a concentric spud and bolted to the pulley with a plurality of bolts spaced around the axis of the shaft. When mounted in this manner, all vibrations in the shaft and pulley are transmitted directly to the fan.

U.S. Pat. Nos. 3,757,914 (Elmer), 3,893,555 (Elmer) and 4,682,679 (Elmer) all teach structures for isolating a fan against the torsional vibrations which may arise when using a viscous drive or other thermal clutch in connection with a cooling fan. However, these references do not address the problem of isolating the fan against pitch and yaw vibrations.

SUMMARY OF THE INVENTION

The object of the present invention is to isolate a fan from vibrations, e.g., engine vibrations, tending to cause the axis of the fan to pitch and yaw. At the same time, it is the object of the present invention to provide a solid pilot and drive to the fan to ensure proper rotation thereof.

These and other objects are accomplished according the present invention by positioning a spacer about each fan bolt with two stiff washers at either end of the spacer. Elastomeric washers then are positioned about the spacer on either side of the fan between the fan and the stiff washers. The spacer, stiff washers and elastomeric washers are sized such that only a slight compression is applied to the elastomeric washers when the bolt is tightened. In addition, the inside diameter of the bolt hole through the fan is sized slightly, e.g., about 1 mm or a few hundredths of an inch, larger than the outside diameter of the spacer.

This structure has the advantage that it isolates the fan from pitch and yaw vibrations (within reasonable amplitude limits) being transmitted to the fan drive shaft, e.g., by an engine, while still providing direct, solid piloting and drive to the fan. In addition, even if the elastomeric washers deteriorate, the fan should still function (albeit with some rattle and noise) due to the direct drive from the spacers.

BRIEF DESCRIPTION OF THE DRAWING

The single FIGURE illustrates a cross-sectional view of a preferred embodiment of the fan mount according to the present invention.

DETAILED DESCRIPTION OF THE PREFERRED EMBODIMENT

Referring to the FIGURE, a drive shaft 10 is mounted to and driven by an engine or the like (not shown), and has a pulley, fan spacer 12, or the like mounted to the end thereof. The drive shaft 10 and fan spacer 12 are provided with a plurality of tapped bores 14 and fan spacer bores 15, respectively, spaced about the drive shaft 10. For convenience of illustration, only two sets of bores 14, 15 are shown, but it would be understood that more bores normally would be provided, e.g., four to eight.

A fan 16 (only the hub of which is shown) is positioned at the front of the drive shaft 10 and fan spacer 12. The fan 16 typically is formed of metal and is provided with a plurality of through bores 18 corresponding to the plurality of tapped bores 14.

A bolt 20 extends through each through bore 18 and fan spacer bore 15 to threadedly engage the corresponding tapped bore 14. A stiff, e.g., spacer 22 is positioned about each bolt 20 at an axial portion thereof predominately inside the through bore 18, but extends partially beyond the through bore 18 on either side of the fan 16. Stiff, e.g., metal, washers 24, 26 are positioned about each bolt 20 on either side of the fan 16 at each end of the spacer 22. Elastomeric, e.g., rubber, washers 28, 30 are positioned about each spacer 22 on either side of the fan 16.

When assembled, the threaded engagement of each bolt 20 with the corresponding tapped hole 14 compresses the spacer 22 and washers 24, 26, 28, 30 together. The various elements are sized such that when each bolt 20 is tightened fully in the corresponding tapped hole 14, only a slight compression is applied to the elastomeric washers 28, 30, with the spacer 22 and stiff washers 24, 26 preventing further compression. In addition, the inner diameter of each through bore 18 and the outer diameter of each spacer 22 are sized to provide a small clearance A on the order of 1 mm or a few hundredths of an inch between the through bores 18 and the spacers 22.

The combination of the slight compression of the elastomeric washers 28, 30 and the small clearance A allows the fan to float axially along the spacer 22, and to change in angle relative to the bolt 20 and drive shaft 10 (within the limits of the clearance A). This serves to isolate the fan 16 from normal amplitude vibrations tending to cause pitch and yaw of the drive shaft 10 and fan spacer 12. At the same time, the spacers 22 provided a direct metal-to-metal piloting and drive of the fan 16.

While the invention has been described in conjunction with a specific embodiment, it is to be understood that many alternatives, modifications and variations will be apparent to those skilled in the art in light of the aforegoing description. Accordingly, this invention is intended to embrace all such alternatives, modifications and variations which fall within the spirit and scope of the appended claims.

I claim:

1. A fan mount comprising:
   a drive shaft having a plurality of tapped bores formed therein spaced circumferentially around the axis of the drive shaft;
   a fan positioned at the end of said drive shaft and having a fan hub with a plurality of through bores formed therein, each said through bore corresponding in position to one of said tapped bores;

drive means positioned in said through bores and connected to said tapped bores for providing a direct piloting and drive to said fan, said fan being axially movable along said means and able to pitch and yaw slightly relative to the axis of said drive means, said drive means including:
- a plurality of bolts, each bolt extending through one of said through bores and threadedly engaging the corresponding one of said tapped bores;
- a plurality of stiff spacers, each spacer being positioned about one of said bolts and an inside diameter of each said through bore and an outside diameter of each said spacer being sized to provide a small clear space therebetween, thereby permitting said fan to pitch and yaw relative to said drive means axis; and
- a plurality of stiff washers, each stiff washer being positioned about one of said bolts, with one stiff washer at each end of said spacer on opposite sides of said fan.

2. The fan mount of claim 1, wherein said drive means further comprises:
a plurality of elastomeric washers, each elastomeric washer being positioned about one of said spacers, with one elastomeric washer on each side of said fan between the said fan and the corresponding stiff washer.

3. A fan mount comprising:
- a drive shaft having a plurality of tapped bores formed therein spaced circumferentially around the axis of the drive shaft;
- a fan spacer mounted to the end of the drive shaft for rotation therewith and having a plurality of fan spacer bores formed therein, each fan spacer bore corresponding in position to one of said tapped bores;
- a fan positioned about said fan spacer and having a fan hub with a plurality of through bores formed therein, each said through bore corresponding in position to one of said tapped bores;
- a plurality of bolts, each bolt extending through one of said through bores, one of said fan spacer bores and threadedly engaging the corresponding one of said tapped bores;
- a plurality of stiff spacers, each spacer being positioned about one of said bolts at an axial position thereof predominately inside the corresponding through bore, but with a portion thereof extending beyond said through bore on either side of said fan, an inner diameter of each said through bore and an outer diameter of each said spacer being sized to provide about 1 mm of clear space therebetween;
- a plurality of stiff washers, each stiff washer being positioned about one of said bolts, with one stiff washer at each end of said spacer on opposite sides of said fan; and
- a plurality of elastomeric washers, each elastomeric washer being positioned about one of said spacers, with one elastomeric washer on each side of said fan between the said fan and the corresponding stiff washer.

4. The fan mount of claim 3, wherein the elastomeric washers are slightly compressed.

5. The fan mount of claim 3, wherein the stiff washers are formed of metal.

6. The fan mount of claim 3, wherein said drive shaft comprises an engine drive shaft.

* * * * *